(12) United States Patent
Wang et al.

(10) Patent No.: US 6,726,260 B1
(45) Date of Patent: Apr. 27, 2004

(54) EXTENDING BUMPER WITH COMBINED STIFFENER AND METHOD

(75) Inventors: Jenne-Tai Wang, Troy, MI (US); Gary L. Jones, Farmington Hills, MI (US); Ching-Shan Cheng, Canton, MI (US); Heui Su Kim, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/370,648

(22) Filed: Feb. 20, 2003

(51) Int. Cl.⁷ ............................................. B60R 19/40
(52) U.S. Cl. ........................ 293/119; 293/118; 293/117
(58) Field of Search ................... 293/119, 117, 293/118, 102, 109, 120, 15, 14, 9, 24, 58

(56) References Cited

U.S. PATENT DOCUMENTS

| | | | |
|---|---|---|---|
| 2,016,833 A | * 10/1935 | Lloyd | 293/58 |
| 2,179,163 A | * 11/1939 | Roth | 293/119 |
| 3,677,595 A | * 7/1972 | Hamilton | 293/119 |
| 3,709,542 A | * 1/1973 | Fehlau et al. | 293/118 |
| 3,913,963 A | * 10/1975 | Persicke | 293/118 |
| 3,992,047 A | * 11/1976 | Barenyi et al. | 293/117 |
| 4,138,152 A | * 2/1979 | Prue | 293/117 |
| 4,514,002 A | * 4/1985 | McIntosh | 293/118 |
| 4,582,351 A | * 4/1986 | Edwards | 293/118 |
| 4,722,651 A | * 2/1988 | Antal | 293/117 |
| 4,979,770 A | * 12/1990 | Shal-Bar | 293/131 |
| 5,022,703 A | * 6/1991 | Westbrook | 293/118 |
| 5,360,311 A | * 11/1994 | Lutz et al. | 293/118 |
| 5,370,429 A | 12/1994 | Reuber et al. | |
| 5,673,953 A | * 10/1997 | Spease | 293/119 |
| 5,967,573 A | 10/1999 | Wang | |
| 6,089,628 A | * 7/2000 | Schuster | 293/118 |
| 6,089,629 A | * 7/2000 | Hope et al. | 293/132 |
| 6,106,038 A | * 8/2000 | Dreher | 293/119 |
| 6,176,529 B1 | * 1/2001 | Kitzmiller et al. | 293/134 |
| 6,193,460 B1 | * 2/2001 | Damico | 293/118 |
| 6,224,120 B1 | * 5/2001 | Eipper et al. | 293/119 |
| 6,302,458 B1 | 10/2001 | Wang et al. | |
| 6,394,512 B1 | * 5/2002 | Schuster et al. | 293/119 |
| 6,401,565 B1 | * 6/2002 | Wang et al. | 293/119 |
| 6,460,909 B2 | * 10/2002 | Mansoor et al. | 293/112 |
| 6,575,509 B1 | * 6/2003 | Golden | 293/119 |
| 6,601,895 B1 | * 8/2003 | Tannenbaum et al. | 296/26.09 |
| 2003/0137156 A1 | * 7/2003 | Ledford et al. | 293/102 |

FOREIGN PATENT DOCUMENTS

| | | | |
|---|---|---|---|
| JP | 55 83635 | * | 6/1980 |
| JP | 5 147483 | * | 6/1993 |
| JP | 6 64489 | * | 3/1994 |

* cited by examiner

*Primary Examiner*—Kiran Patel
(74) *Attorney, Agent, or Firm*—Kathryn A. Marra

(57) ABSTRACT

A pre-impact mode of a bumper system is provided by extending a bumper member outwardly and extending a stiffener member downwardly. Both the bumper member and the stiffener member are separately adapted to engage an object. The bumper system includes a bumper member movable between a retracted position and a laterally extended position. A stiffener member is movable between a retracted position and a downwardly extended position. An actuator mechanism is adapted to move the bumper member between the retracted and laterally extended positions and to cause the stiffener member to move between the retracted and downwardly extended positions as a result of moving the bumper member.

18 Claims, 3 Drawing Sheets

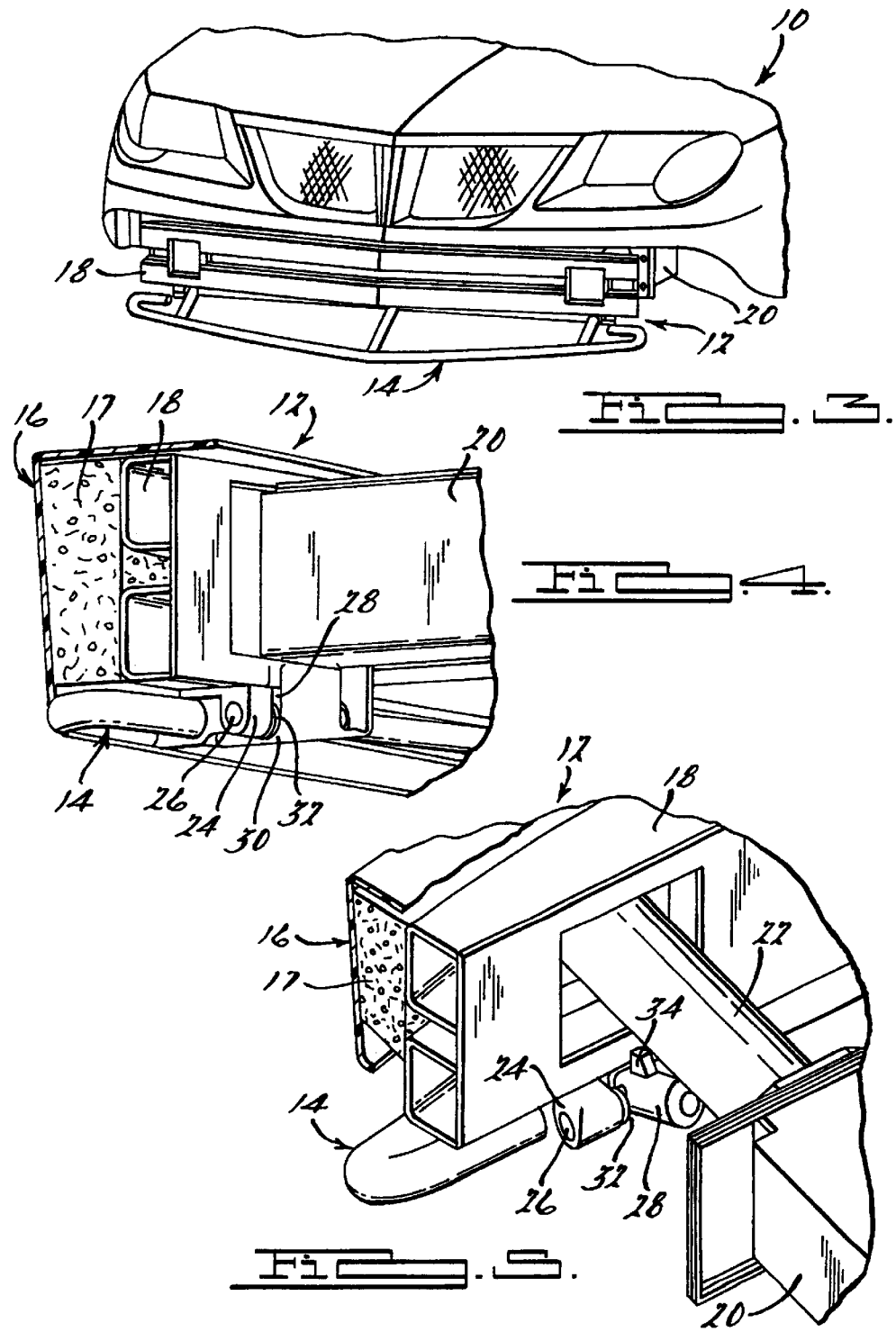

EXTENDING BUMPER WITH COMBINED STIFFENER AND METHOD

FIELD OF THE INVENTION

The present invention relates to motor vehicle bumper systems.

BACKGROUND OF THE INVENTION

A motor vehicle typically has a bumper bar supported on a body of the motor vehicle by energy absorbers which convert into work a fraction of the kinetic energy of a low speed impact on the bumper bar. Such bumper energy absorbers commonly include relatively moveable structural elements attached to the body and the bumper bar and a resistance medium between the structural elements. In a high speed impact, kinetic energy is converted into work by plastic deformation of body structure of the motor vehicle between a passenger compartment thereof and the point of impact. As motor vehicles have become more compact, however, the energy absorbing capability of the body structure of the motor vehicle has decreased as the span between the passenger compartment and the bumper bar has decreased.

A bumper energy absorber has been provided which supports a bumper bar close to a body of a motor vehicle except when sensors on the vehicle detect an impending impact. In that circumstance, the bumper energy absorber extends the bump bar out from the body to increase the span between the passenger compartment and the bumper bar and thereby increase the fraction of the kinetic energy of a high speed impact on the bumper bar that is converted into work. Exemplary outwardly extending bumpers are described, e.g., in U.S. Pat. No. 6,302,458, U.S. Pat. No. 5,967,573 and U.S. Pat. No. 5,370,429.

Stationary bumpers have also separately been provided with a stiffener assembly which is capable of extending downwardly. The stiffener assembly is adapted to resist a lower leg of a pedestrian from bending under the vehicle in case of an impact. An exemplary downwardly extending stiffener assembly attached to a stationary bumper is described in U.S. Pat. No. 6,089,628.

SUMMARY OF THE INVENTION

In accordance with a first aspect of the present invention a method of placing a bumper system in a pre-impact mode is provided. The method includes extending a bumper member outwardly and extending a stiffener member downwardly. Both the bumper member and the stiffener member being separately adapted to engage an object.

In accordance with another aspect of the present invention a motor vehicle bumper system is provided. The bumper system includes a bumper member movable between a retracted position and a laterally extended position. A stiffener member is movable between a retracted position and a downwardly extended position. An actuator mechanism is adapted to move the bumper member between the retracted and laterally extended positions and to cause the stiffener member to move between the retracted and downwardly extended positions as a result of moving the bumper member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a fragmentary perspective view similar to FIG. 2, but with the bumper facia removed;

FIG. 4 is a fragmentary perspective view from below of the bumper system in its retracted position;

FIG. 5 is a fragmentary perspective view from above of the bumper system in its extended position;

DETAILED DESCRIPTION OF THE PREFERRED EMBODIMENTS

The following description of the preferred embodiment(s) is merely exemplary in nature and is in no way intended to limit the invention, its application, or uses.

Figure 1:
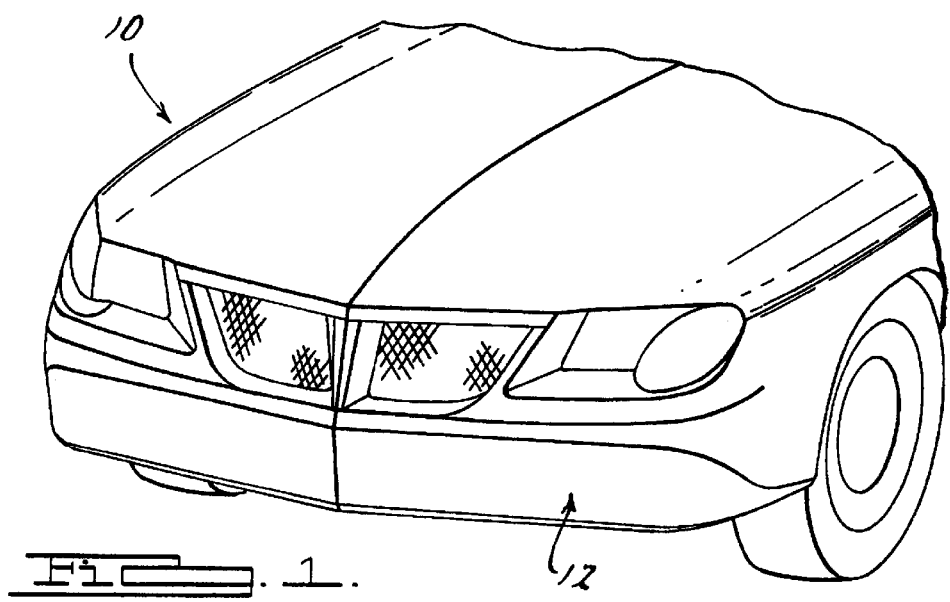
FIG. 1 is a fragmentary perspective view of an automobile with a preferred bumper system of the present invention illustrated in its retracted position.
Figure 2:
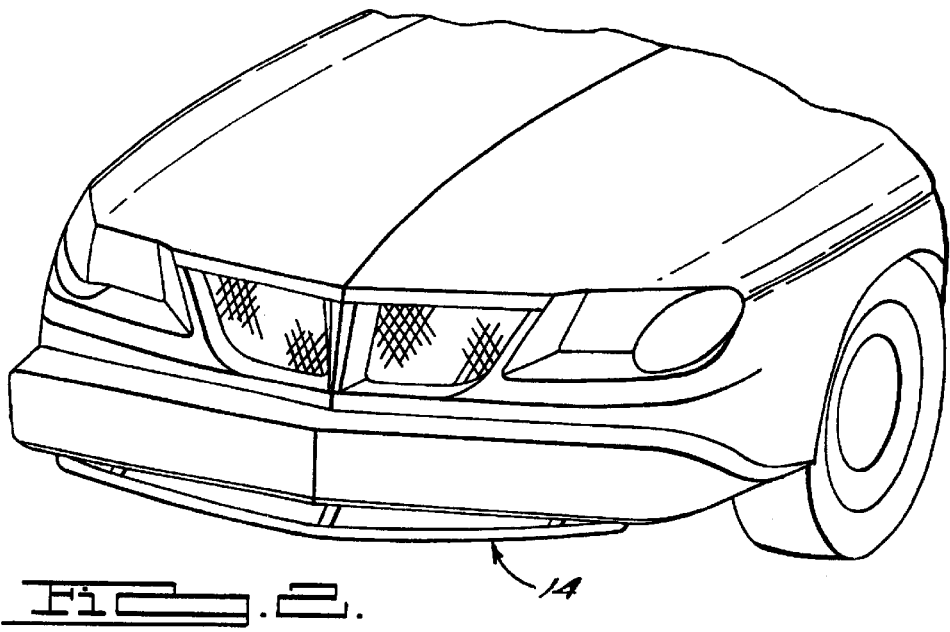
FIG. 2 is a fragmentary perspective view similar to FIG. 1, but with the preferred bumper system in its extended position.

Referring to FIG. 1, a motor vehicle 10 having a preferred bumper system including a deployable or extendable bumper member 12 and combined stiffener 14 is illustrated in the retracted or stowed position. FIG. 2 illustrates the preferred bumper system in its deployed or extended position. As can be seen by comparing FIG. 1 with FIG. 2, the bumper system generally includes a horizontal, transverse bumper member 12 which is extended laterally, in a generally linear direction, to its deployed or extended position. Similarly, a stiffener member 14 is likewise extended downwardly to its deployed or extended position. The stiffener member 14 is made of any suitable material. Preferable materials include aluminum, steel and plastic.

Referring to FIG. 3, the fascia 16 of the bumper member 12 is removed to more clearly illustrate the bumper beam 18 and the stiffener member 14 mounted transversely across the front of the motor vehicle 10. The bumper member 12 and stiffener member 14 are elongated members aligned generally transversely to the motor vehicle 10. In addition, the bumper system is attached to the motor vehicle 10 via two frame rails 20 thereof.

Referring to FIG. 4, the preferred bumper system is illustrated in the retracted or stowed position. Only the left side of the bumper system is illustrated, since both the left and right sides are symmetrical. The bumper member 12 includes a bumper beam 18 which is attached to the frame rail 20 via an extension tube 22 (seen in FIG. 5). The exterior face of the bumper beam 18 is covered by a fascia 16 including an energy absorbent material 17. Attached to the lower surface of the bumper beam 18 is a hinge block 24. A pivot shaft 26 extends through the hinge block 24 and through a pivot arm 28 of the stiffener member 14 to pivotally attach the bumper beam 18 and the stiffener member 14 together.

A contact flange 30 is attached to the lower surface of a frame rail 20 of the motor vehicle 10. In the illustrated retracted position, the contact flange 30 pushes against the pivot arm 28 of the stiffener member 14; overcoming the weight of the stiffener member 14 and the biasing force of the spring member 32 to maintain the stiffener member 14 in its raised or retracted position. Thus, when the bumper member 12 is in its retracted position, the stiffener member 14 is also located in its retracted position as a result of the interaction between the contact flange 30 and the stiffener member 14.

Figure 6:
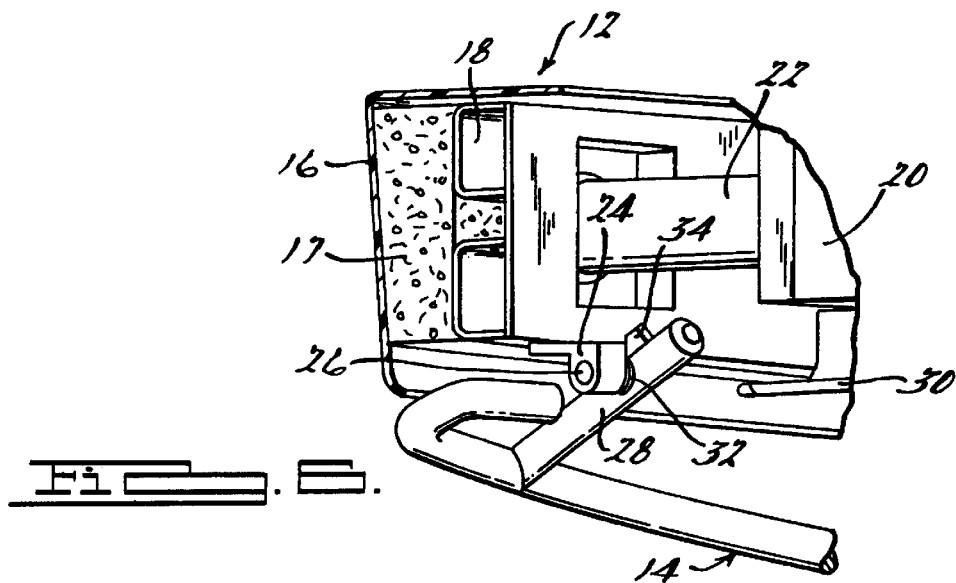
FIG. 6 is a fragmentary perspective view from below of the extended bumper system of FIG. 5.

Referring to FIGS. 5 and 6, the bumper member 12 is moved laterally, linearly outwardly into its deployed or extended position by an extension tube 22 which is part of the actuation mechanism. During this movement the contact flange 30 is moved out of contact with the stiffener member 14. As a result, the stiffener member 14 is able to rotate in response to gravity and the biasing force of the spring 32 into its deployed position. A stop 34 located on the pivot arm 28 of the stiffener member 14 engages against the bumper beam 18 to cause the rotation of the stiffener member 14 to cease; appropriately positioning it. Thus, the stiffener member 14 is extended downwardly via rotary movement about the pivot shaft 26 into its deployed position, where the stop 34 engages against the bumper beam 18. Gravity and the spring 32 continue to bias the stiffening member 14 toward this downwardly extended position.

Based on the above, it should be apparent that the bumper system has two modes of operation. In a first mode the bumper system is in its retracted position. In this mode, the bumper member 12 is retracted inwardly, toward the vehicle body. Similarly, the stiffener member 14 is retracted upwardly and is generally concealed behind the fascia 16 of the bumper. The bumper system may be placed in an impact mode under certain conditions. In this impact mode the bumper member 12 and stiffener member 14 are extended as previously described. A pre-crash sensor 36 (seen in FIG. 7) is provided to determine whether there is a heightened risk of an impact. The sensor 36 uses, for example, radar, infrared light and/or a visual image system to detect the heightened risk of impact. The sensor 36 senses changes in conditions to make move the bumper system between the two modes.

Placing the bumper system in an impact mode is accomplished by extending the bumper member 12 outwardly. This is done by activating an actuator (not seen) in the situations discussed above. The actuator linearly extends the extension tube 22, causing the bumper member 12 to extend linearly outwardly away from the motor vehicle body. As described above, this action causes the stiffener member 14 to be rotated to extend downwardly as a result of the pivot arm 28 moving away from the contact flange 30. The rotation continues until the stop 34 is reached.

Figure 7:
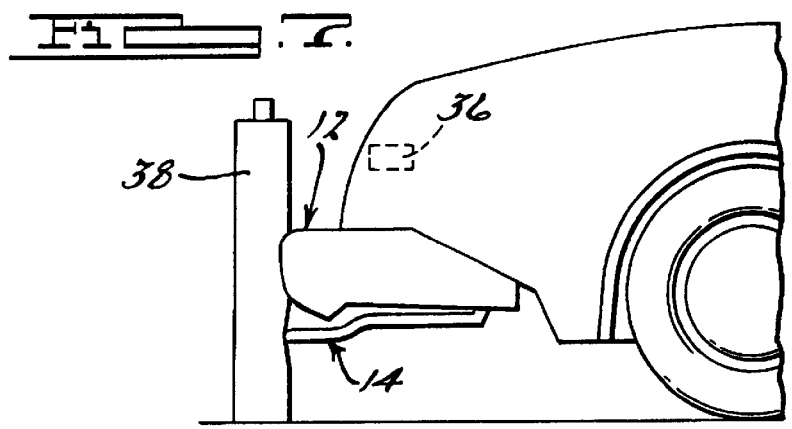
FIG. 7 is a fragmentary side elevation view of the extended bumper system initially contacting a stationary object.
Figure 8:
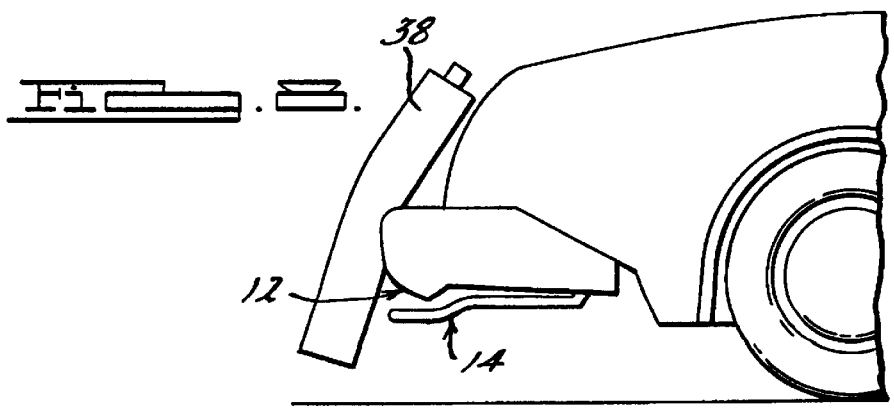
FIG. 8 is a fragmentary side elevation view similar to FIG. 7 illustrating the contact at a slightly later point in time.

Referring to FIG. 7 and FIG. 8, an illustration of an impact with an object 38 is provided when the bumper member 12 and the stiffener member 14 are in their deployed position. FIG. 7 illustrates the initial contact of the bumper system with the object 38. This initial contact, including the contact with the stiffener member 14, helps to prevent the object 38 from being pulled under the motor vehicle 10. Instead, the bumper system tends to cause the object to rotate up onto the hood of the vehicle 10.

Many modifications to the above-described preferred embodiment are possible. For example, in one alternative a rotating member is provided on the contact flange 30 to reduce friction between the contact flange 30 and the stiffener member 14 during actuation. In another alternative, the pre-impact sensor 36 is integrated with the speedometer. For example, at higher speeds the bumper system will be deployed in the impact mode.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of placing a bumper system in a pre-impact state, comprising:
   extending a bumper member outwardly from a retracted position prior to an impact, the bumper member being adapted to engage an object; and
   extending a stiffener member downwardly from a retracted position prior to an impact, the stiffener member being adapted to engage an object.

2. A method according to claim 1 wherein the extending outwardly of the bumper member is accomplished by actuating an actuator which also enables the extending downwardly of the stiffener member.

3. A method according to claim 1 wherein the extending downwardly is at least partially accomplished by enabling gravity to act upon the stiffener member, moving the stiffener member downwardly.

4. A method according to claim 1 wherein the extending outwardly of the bumper member moves the stiffener member in relation to a contact flange, thereby causing the stiffener member to move downwardly.

5. A method according to claim 1 wherein the extending outwardly occurs by moving the bumper member in a linear direction and the extending downwardly occurs by moving the stiffener member in a rotary direction.

6. A method according to claim 1 further comprising determining whether to extend the bumper member and stiffener member.

7. A method according to claim 1 further comprising sensing a pre-impact condition.

8. A method according to claim 7 further comprising returning the bumper member and the stiffener member to a retracted position upon sensing a change in condition.

9. A method according to claim 1 further comprising returning the bumper member and the stiffener member to a retracted position upon sensing a change in condition.

10. A motor vehicle bumper system comprising:
    a bumper member adapted to engage an object movable between a retracted position and a laterally extended position;
    a stiffener member adapted to engage an object movable between a retracted position and a downwardly extended position;
    an actuator mechanism adapted to move the bumper member between the retracted and laterally extended positions and to cause the stiffener member to move between the retracted and downwardly extended positions as a result of moving the bumper member.

11. A motor vehicle bumper system according to claim 10 wherein the actuator mechanism extends the bumper member away from a frame rail of the motor vehicle.

12. A motor vehicle bumper system according to claim 11 wherein the bumper member is a generally horizontally aligned bumper beam.

13. A motor vehicle bumper system according to claim 12 wherein the bumper beam further comprises an energy absorbing material and a fascia member.

14. A motor vehicle bumper system according to claim 10 wherein the stiffener member is pivotally attached to the bumper member.

15. A motor vehicle bumper system according to claim 10 further comprising a contact flange associated with a frame of the motor vehicle, the contact flange being adapted to engage the stiffener member as the stiffener member moves toward the retracted position and to raise the stiffener member into the retracted position.

16. A motor vehicle bumper system according to claim 10 wherein the stiffener member is adapted to move downwardly under the force of gravity when the bumper member moves to the laterally extended position.

17. A motor vehicle bumper system according to claim 10 further comprising a sensor adapted to provide input to cause the actuator mechanism to activate.

18. A motor vehicle bumper system according to claim 10 further comprising a spring adapted to bias the stiffener member toward the downwardly extended position.

* * * * *